(12) United States Patent
Wang et al.

(10) Patent No.: US 8,294,980 B2
(45) Date of Patent: Oct. 23, 2012

(54) DELAY LINE INTERFEROMETER WITH LIQUID CRYSTAL TUNING ELEMENT

(75) Inventors: Ruibo Wang, Mountain House, CA (US); Ruipeng Sun, Pleasanton, CA (US)

(73) Assignee: Oclaro Technology Limited, Northhamptonshire (GB)

( * ) Notice: Subject to any disclaimer, the term of this patent is extended or adjusted under 35 U.S.C. 154(b) by 242 days.

(21) Appl. No.: 12/860,639

(22) Filed: Aug. 20, 2010

(65) Prior Publication Data

US 2012/0044565 A1    Feb. 23, 2012

(51) Int. Cl.
*G02F 2/00* (2006.01)
*H04B 10/06* (2006.01)

(52) U.S. Cl. ......... 359/326; 359/325; 398/202; 398/205

(58) Field of Classification Search .................. None
See application file for complete search history.

(56) References Cited

U.S. PATENT DOCUMENTS

2006/0268408 A1* 11/2006 Toussaint et al. ............. 359/487
2011/0217048 A1*  9/2011 Shimizu et al. ............... 398/202

OTHER PUBLICATIONS

Govan et al., "An RZ DPSK Receiver Design with Significantly Improved Dispersion Tolerance," *Optics Express* 15(25):16916-16921 (Dec. 10, 2007).
Govan et al., "Reduction of XPM Penalty by Sub-Bit Delay Demodulation of DQPSK," *Optical Society of America* (3 pages) (2010).
Mikhailov et al., "Experimental Investigation of Partial Demodulation of 85.3 Gb/s DQPSK Signals," *ECOC* 3:59-60 (Sep. 21-25, 2008).
Mikkelsen et al., "Partial DPSK with Excellent Filter Tolerance and OSNR Sensitivity," *Electronics Letters*, vol. 42, No. 23 (2 pages) (Nov. 9, 2006).

* cited by examiner

*Primary Examiner* — Hemang Sanghavi
(74) *Attorney, Agent, or Firm* — Patterson & Sheridan, L.L.P.

(57) ABSTRACT

A delay line interferometer is configured with a liquid-crystal (LC) tuning element as a phase modulator for demodulating a phase-modulated input signal. The LC tuning element allows for quickly tuning the phase difference between two optical signals separated from the phase-modulated input signal, so that the two optical signals can be coherently recombined to interfere with each other and produce one or more intensity-modulated optical signals. In some embodiments, the LC tuning element is configured to reduce polarization-dependent frequency shift without the use of additional high-precision optical elements and/or coatings.

20 Claims, 6 Drawing Sheets

DELAY LINE INTERFEROMETER WITH LIQUID CRYSTAL TUNING ELEMENT

BACKGROUND OF THE INVENTION

1. Field of the Invention

Embodiments of the present invention relate generally to optical communication systems and components and, more particularly, to a delay-line interferometer with a liquid crystal tuning element.

2. Description of the Related Art

Differential phase-shift keying (DPSK) is a form of phase modulation used in optical communication systems that conveys data in an optical signal by changing the phase of the carrier wave. Optical communication systems commonly use signal phase modulation, and particularly DPSK, for transmission since phase modulation is strongly resistant to signal degradation caused by chromatic dispersion or polarization mode dispersion in a transmission line. In order to convert such a phase-keyed signal into an amplitude-keyed signal, i.e., an optical-intensity-keyed signal, delay line interferometers are used in optical communication systems as signal demodulators. Delay line interferometers are commonly Mach-Zehnder or Michelson interferometers based on multiple beam interference, in which one beam is time-delayed with respect to another by a desired time interval to produce an interference intensity. Typically, an incoming DPSK optical signal is split into two substantially equal-intensity beams in two arms of the delay line interferometer, where one beam is delayed by a given optical path difference corresponding to a one-bit time delay in the DPSK scheme. The beams are recombined in the delay line interferometer to produce constructive or destructive interference in the time domain for each bit. The resultant interference intensity is the amplitude-keyed signal.

As the bit rates used in optical communication systems increase into the gigabits per second (Gbps) regime, optical systems capable of accurately demodulating phase modulated signals become increasingly difficult to manufacture due to the precise alignment and sizing of optical components and coatings required. Accordingly, there is a need in the art for delay line interferometers that provide the requisite optical performance for Gbps optical communication systems using combinations of basic and easy-to-manufacture optical components.

SUMMARY OF THE INVENTION

One or more embodiments of the present invention provide a delay line interferometer with a liquid-crystal (LC) tuning element. The LC tuning element allows for quickly tuning the phase difference between two optical signals separated from a phase-modulated input signal, so that the two optical signals can be coherently recombined to interfere with each other and produce one or more intensity-modulated optical signals. In some embodiments, the LC tuning element is configured to reduce polarization-dependent frequency shift without the use of additional high-precision optical elements and/or coatings.

An interferometer according to an embodiment of the present invention comprises a beam-splitting element, an optical time delay element, and an LC tuning element. The beam-splitting element is configured to spatially separate a phase-modulated light beam into a first light beam having a first linear polarization state and a second light beam having a second linear polarization state, wherein the first linear polarization state is orthogonal to the second linear polarization state. The optical time delay element is disposed in a path of the first light beam and a path of the second light beam and is configured to create a longer optical path for the first light beam than for the second light beam. The LC tuning element is disposed in the path of the first light beam and is configured to modulate the phase of the first light beam with respect to the phase of the second light beam.

An interferometer according to another embodiment of the present invention comprises a beam-splitting element, an optical time delay element, an LC tuning element, a beam-combining element, a wave plate, and a polarizing beam splitter. The beam-splitting element is configured to spatially separate a phase-modulated light beam into a first light beam having a first linear polarization state and a second light beam having a second linear polarization state, wherein the first linear polarization state is orthogonal to the second linear polarization state. The optical time delay element is disposed in a path of the first light beam and a path of the second light beam and is configured to create a longer optical path for the first light beam than for the second light beam. The LC tuning element is disposed in the path of the first light beam and in the path of second light beam and is configured to modulate the phase of the first light beam with respect to the phase of the second light beam and the phase of the second light beam with respect to the phase of the first light beam. The beam-combining element is configured to combine the phase-modulated first light beam and the second light beam into a circularly polarized light beam. The wave plate is configured to convert the circularly polarized light beam to a linearly polarized light beam. The polarizing beam splitter is configured to direct an optical input from an input port to the beam-splitting element and the linearly polarized light beam from the beam-combining element to an output port.

According to another embodiment of the present invention, in a delay line interferometer a method of demodulating a phase-modulated optical signal comprises dividing the phase-modulated optical signal into a first light beam having a first linear polarization state and a second light beam having a second linear polarization state, wherein the first linear polarization state is orthogonal to the second linear polarization state, introducing a substantially one-bit time delay in the first light beam, modulating the phase of the first light beam with respect to the phase of the second light beam by directing the first light beam through an LC tuning element, and using interference in the time domain between the phase-modulated first light beam and the second light beam to demodulate the phase-modulated optical signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
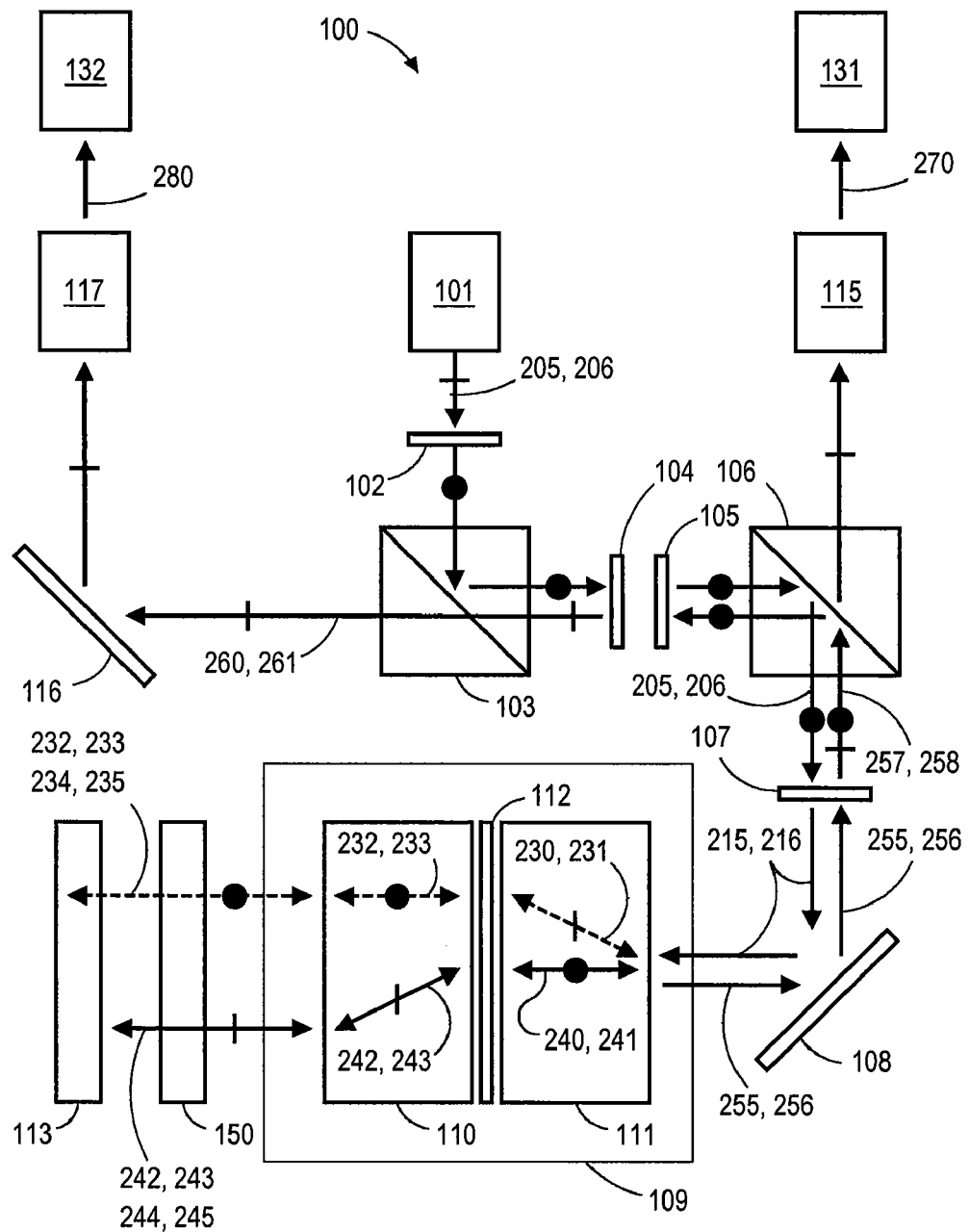
FIG. 1 schematically illustrates a delay line interferometer with a liquid crystal (LC) tuning element, according to embodiments of the invention.

FIG. 1 schematically illustrates a delay line interferometer 100 with a liquid crystal (LC) tuning element 150, according to embodiments of the invention. Delay line interferometer 100 includes an input collimator 101, output collimators 115, 117, polarizing beam splitters 103, 106, mirrors 108, 116, a separating and combining subassembly 109, LC tuning element 150, an optical delay element 113, and assorted polarization plates, i.e., a 45 degree half wave plate 102, a Faraday rotator 104, a 22.5 degree half wave plate 105, and a quarter wave plate 107. Delay line interferometer 100 is configured to receive a phase-modulated input signal 120, such as a DPSK signal, separate phase-modulated input signal 120 into two equal-intensity beams, introducing a substantially one-bit time delay between the two equal-intensity beams, and recombining the two beams to produce constructive or destructive interference in the time domain for each information bit of phase-modulated input signal 120. In the embodiment illustrated in FIG. 1, the interference intensity is measured by a pair of photodiodes 131, 132 that form a balanced photodetector and are optically coupled to output collimators 115, 117, respectively.

Figure 2:
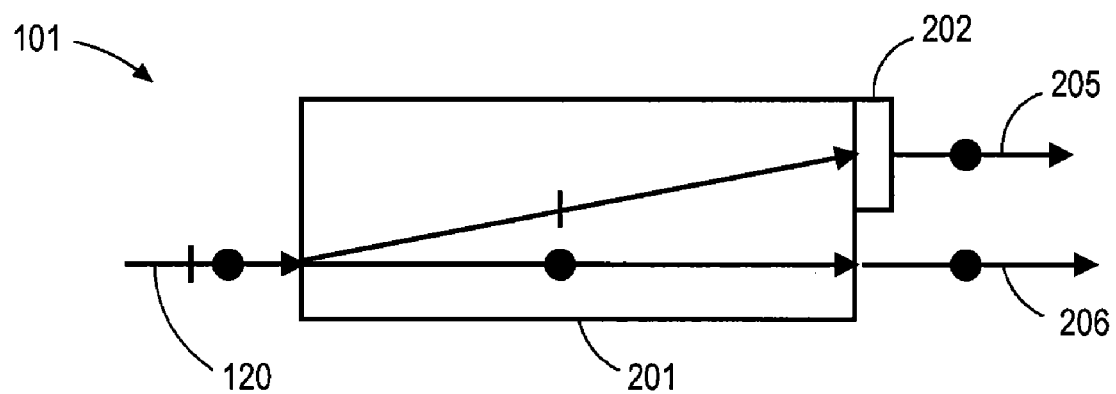
FIG. 2 schematically illustrates one embodiment of an input collimator for a delay line interferometer.

FIG. 2 schematically illustrates one embodiment of input collimator 101 for delay line interferometer 100. In such an embodiment, input collimator 101 includes a birefringent crystal 201 and a half wave plate 202. Birefringent crystal 201 is a birefringent material that performs the function of a polarization-dependent beam displacer, and may be a yttrium orthovanadate (YVO$_4$) crystal or other birefringent material, such as calcite, rutile, and the like. YVO$_4$ has better temperature stability and physical and mechanical properties than calcite, and is easier to process than rutile, which is very hard relative to YVO$_4$. Half wave plate 202 is an optical device that alters the polarization state of a light wave travelling through it. A wave plate works by shifting the phase between two perpendicular polarization components, i.e., s-polarization (denoted by a dot) and p-polarization (denoted by a line), of an incident light wave. Half wave plate 202 may be a birefringent crystal with a chosen orientation and thickness, where the crystal is cut so that the extraordinary optic axis is parallel to the surfaces of the plate and the ordinary optic axis is perpendicular to the surfaces of the plate. Light polarized along the extraordinary axis travels through the crystal at a different speed than light with the perpendicular polarization, creating a phase difference. The thickness of a wave plate 202 is selected so that light with polarization components along both axes will emerge in a different polarization state. The thickness of half wave plate 202 is selected to retard one polarization by half a wavelength, or 180 degrees, thereby rotating a linear polarization by 90 degrees. Thus, in combination, birefringent crystal 201 and half wave plate 202 convert an input optical beam with a random polarization state, e.g., phase-modulated input signal 120, into two parallel beams 205, 206 that are spatially separated and have the same linear polarization state, e.g., either s- or p-polarization.

In operation, delay line interferometer 100 receives phase-modulated input signal 120 with input collimator 101, which converts phase-modulated input signal 120 from random polarization to parallel beams 205, 206, each having the same polarization. For purposes of description, parallel beams 205, 206 are considered to be p-polarized when leaving input collimator 101, but parallel beams 205, 206 may both be either s- or p-polarized without altering the functionality of delay line interferometer 100. For clarity, parallel beams 205, 206 are illustrated as a single line in FIG. 1. Parallel beams 205, 206 pass through 45 degree half wave plate 102 so that the polarization state is rotated by 90 degrees, i.e., from p-polarization to s-polarization. Polarizing beam splitter 103 then deflects parallel beams 205, 206 as shown. Polarizing beam splitter 103 is configured to split an incoming un-polarized or mixed-polarization optical beam into two orthogonal linearly polarized optical beams, i.e., an s-polarized beam and a p-polarized beam. Polarizing beam splitter 103 may be a Wollaston prism or other birefringent optical element. In the configuration of polarizing beam splitter 103 illustrated in FIG. 1, a p-polarized light beam passes through polarizing beam splitter 103 along the original propagation direction and an s-polarized light beam is deflected at the splitter surface as shown. In some embodiments, polarizing beam splitter 103 is in the form of a cube constructed from two triangular birefringent prisms, which are joined with an attachment layer. Because s-polarized light beam is deflected at the splitter surface of polarizing beam splitter 103, polarizing beam splitter 103 directs parallel beams 205, 206 through Faraday rotator 104 and 22.5 degree half wave plate 105.

When considered together as a single optical assembly, Faraday rotator 104 and 22.5 degree half wave plate 105 are designed to preserve the polarization state of an incident optical beam when transmitted through the optical assembly from left to right, and to rotate a linear polarization by 90 degrees when an optical beam propagates through it in the opposite direction. The Faraday rotator is a well-known optical device that rotates the polarization of light due to a magneto-optic effect. i.e., one linear polarization of the input light is in ferromagnetic resonance with the material, causing the phase velocity of that polarization through the Faraday rotator to be higher than the phase velocity of the orthogonal linear polarization. Because the direction of rotation in which linear polarization is changed by the Faraday rotator is a function of the magnetic field direction in the Faraday rotator and not the direction in which light passes through the Faraday rotator, a linearly polarized beam sent through a Faraday rotator is rotated in the same direction regardless of which direction the beam passes through the Faraday rotator. This non-reciprocal behavior distinguishes Faraday rotators from arrangements of wave plates and polarizers, which rotate polarization differently depending on which direction polarized light passes therethough. Faraday rotator 104 is configured to rotate linear polarization of a light beam 45 degrees only in one direction and 22.5 degree half wave plate 105 is configured to rotate linear polarization of a light beam 45 degrees in either direction, depending on the path of the light beam. Together, Faraday rotator 104 and 22.5 degree half wave plate 105 rotate the polarization of linearly polarized light zero degrees (45 degrees minus 45 degrees) when said light passes from polarizing beam splitter 103 to polarizing beam splitter 106, and 90 degrees (45 degrees plus 45 degrees) when said light passes in the opposite direction. Thus, the polarization of parallel beams 205, 206 remains unchanged when passing through Faraday rotator 104 and 22.5 degree half wave plate 105 from polarizing beam splitter 103 to polarizing beam splitter 106.

After passing through Faraday rotator 104 and 22.5 degree half wave plate 105, parallel beams 205, 206 are deflected by polarizing beam splitter 106 and directed through quarter wave plate 107, as shown. Polarizing beam splitter 106 is substantially similar in configuration to polarizing beam splitter 103 and splits an incoming un-polarized or mixed-polarization optical beam into two orthogonal linearly polarized optical beams so that p-polarized light passes through polarizing beam splitter 106 along the original propagation direction and an s-polarized light beam is deflected. Thus, because parallel beams 205, 206 are s-polarized, they are directed through quarter wave plate 107.

Quarter wave plate 107 is similar to half wave plate 202, in that quarter wave plate 107 is an optical device that alters the polarization state of a light wave travelling through it by shifting the phase between the two perpendicular polarization components of incident light wave. Instead of retarding one polarization by half a wavelength, and thereby rotating a linear polarization by 90 degrees, quarter wave plate 107 creates a quarter-wavelength phase shift, which converts linear polarization into circular polarization. This is done by adjusting the plane of the incident light to the birefringent material of quarter wave plate 107 to make a 45 degree angle with the fast axis of the material, giving ordinary and extraordinary waves with equal amplitude, i.e., circularly polarized light. As with half wave plate 202, quarter wave plate 107 is bi-directional and therefore can also convert circularly polarized light into linearly polarized light when the linearly polarized light is transmitted in the opposite direction therethrough. Thus, as parallel beams 205, 206 pass through quarter wave plate 107, they are each converted into incoming circularly polarized light beams 215, 216. Mirror 108 then directs incoming circularly polarized light beams 215, 216 to separating and combining subassembly 109.

Separating and combining subassembly 109 is configured to split an incoming beam with circular polarization states into two beams with equal intensity (equal optical power) and orthogonal linear polarization states, and to combine outgoing s- and p-polarized beams into a single circularly polarized beam. Thus, incoming circularly polarized light beams 215, 216 are each separated into two separate beams: a p-polarized beam, denoted by a dashed line, and an s-polarized beam, denoted by a solid line. Specifically, incoming circularly polarized light beam 215 is separated into incoming p-polarized beam 230 and incoming s-polarized beam 240, and incoming circularly polarized light beam 216 is separated into incoming p-polarized beam 231 and incoming s-polarized beam 241. For clarity, incoming p-polarized beams 230, 231 are shown as a single dashed-line arrow and incoming s-polarized beams 240, 241 are shown as a single solid-line arrow. In the embodiment illustrated in FIG. 1, separating and combining subassembly 109 includes birefringent elements 110 and 111 separated by a 45 degree half wave plate 112, although other arrangements of optical elements may be also be devised by one of skill in the art to serve as separating and combining subassembly 109. Birefringent elements 110 and 111 may be YVO$_4$ crystals or other suitable birefringent materials, and 45 degree half wave plate 112 is a half wave plate formed so that the plane of the incident light makes a 45 degree angle with the fast axis of the birefringent material of half wave plate 112. Such a combination of birefringent elements and wave plate converts an input un-polarized or mixed-polarization optical beam into two beams with orthogonal polarization states. The two beams propagate in the same direction, but are separated from each other at a distance determined by the length of Birefringent elements 110 and 111. In addition, the two beams follow optical paths through separating and combining subassembly 109 that are substantially equal, which is beneficial for accurate demodulation of phase-modulated input signal 120. It is also noted that half wave plate 112 converts incoming p-polarized beams 230, 231 into incoming s-polarized beams 232, 233 and incoming s-polarized beams 240, 241 into incoming p-polarized beams 242, 243.

Incoming s-polarized beams 232, 233 and incoming p-polarized beams 242, 243 pass through LC tuning element 150 and undergo phase modulation to tune phase-modulated input signal 120 to the optimal phase for maximum signal when demodulating phase-modulated input signal 120. In the embodiment illustrated in FIG. 1, delay line interferometer 100 is a bi-directional configuration, and optical signals processed thereby generally propagate though most optical elements twice, i.e., in an incoming pass and an outgoing pass. In such an embodiment, LC tuning element 150 is a double-pass optical element, and performs half the desired phase tuning of incident light beams at each pass. The organization and operation of LC tuning element 150 is described below in conjunction with FIG. 4. After passing through LC tuning element 150, incoming s-polarized beams 232, 233 and incoming p-polarized beams 242, 243 impinge on optical delay element 113 as shown.

Optical delay element 113 introduces a substantially one-bit time delay between s-polarized beams 232, 233 and incoming p-polarized beams 242, 243. The duration of the one-bit time delay depends on the data rate of phase-modulated input signal 120. For example, in a 40 Gbps system, one bit corresponds to 25 picoseconds, and light travels 5 mm in an optical fiber or 7.5 mm in free space within that period. Thus, the optical path difference between the two beams would be 5 mm or 7.5 mm depending on the type of interferometer and medium in which the time delay is created. In the embodiment in FIG. 1, the time delay is created by the thickness of a mirror, as described below in conjunction with FIG. 3. As is known in the art, by introducing such a time delay between the two phase-modulated light beams making up a phase-modulated signal, i.e., phase-modulated input signal 120, the beams can be recombined to produce constructive or destructive interference in the time domain for each bit, thereby producing one or more intensity-keyed signals from the original phase-modulated signal.

Figure 3:
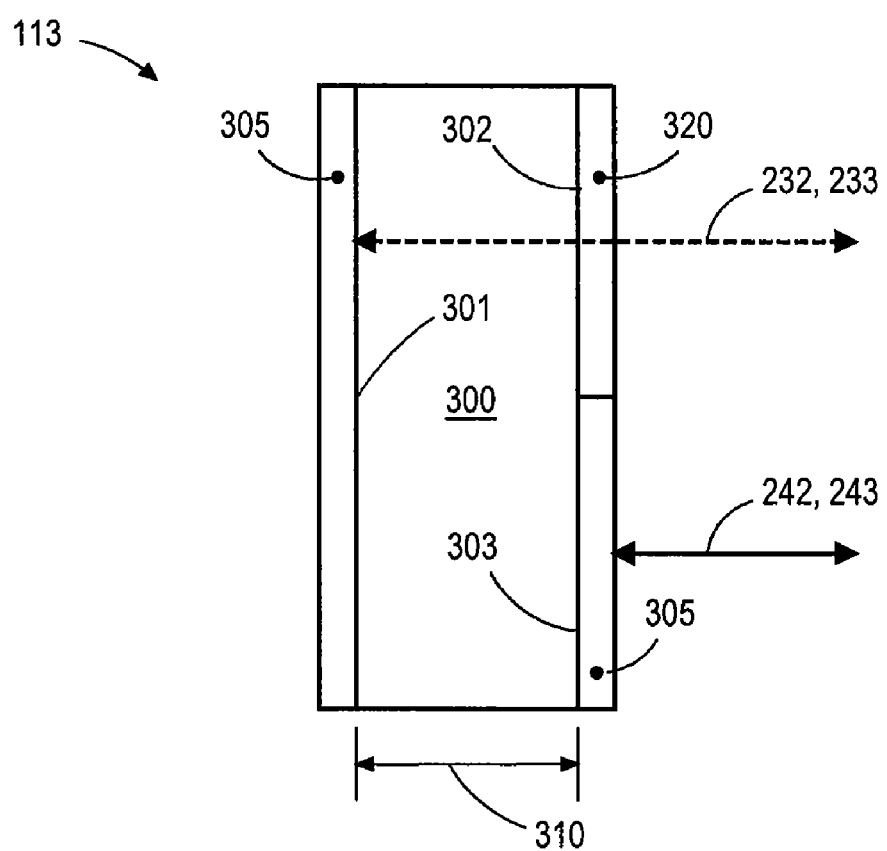
FIG. 3 schematically illustrates an exemplary embodiment of an optical delay element for a delay line interferometer.

FIG. 3 schematically illustrates an exemplary embodiment of optical delay element 113 for delay line interferometer 100. Optical delay element 113 is a dual mirror configuration that includes a body 300, a back surface 301, a transmissive front surface 302, and a reflective front surface 303. Body 300 is an optically transparent material, such as a silicon-based substrate, having a thickness 310 selected to create a substantially one-bit time delay between incoming s-polarized beams 232, 233 and incoming p-polarized beams 242, 243 during operation of delay line interferometer 100. Back surface 301 and reflective front surface 303 are coated with a high reflection (HR) coating 305. Transmissive front surface 302 may be coated with an anti-reflection (AR) coating 320 to minimize optical loss and thereby prevent any unwanted difference between the maximum optical intensity of incoming s-polarized beams 232, 233 and the maximum optical intensity of incoming p-polarized beams 242, 243. Thus, incoming s-polarized beams 232, 233 are transmitted through body 300 as shown and are reflected from HR coating 305 on back surface 301. In contrast, incoming p-polarized beams 242, 243 are reflected from HR coating 305 without being transmitted through body 300. By propagating through body 300 for an incoming and an outgoing pass, incoming s-polarized beams 232, 233 experience a substantially one-bit time delay with respect to incoming p-polarized beams 242, 243. In the embodiment illustrated in FIG. 3, a substantially one-bit time delay between constituent beams making up phase-modulated input signal 120 is created by the thickness of a mirror, however other means of producing may also be used, according to embodiments of the invention. For example, in one embodiment, an arrangement of birefringent optical elements is used to produce different optical paths for incoming s-polarized beams 232, 233 and incoming p-polarized beams 242, 243. Alternatively, in another embodiment, an electro-optic device provides a variable-length optical path selectively for one set of beams. In yet another embodiment, one or more waveguides may be used to provide variable-length optical paths to create a time delay.

After being reflected off of surfaces of optical delay element 113, incoming s-polarized beams 232, 233 are converted to outgoing s-polarized beams 234, 235 and incoming p-polarized beams 242, 243 are converted to outgoing p-polarized beams 244, 245. Because delay line interferometer 100 is a substantially bi-directional configuration, these outgoing beams, i.e., outgoing s-polarized beams 234, 235 and outgoing p-polarized beams 244, 245, follow optical paths that are essentially identical but in the opposite direction to those followed by the incoming beams. Thus, said outgoing beams pass through LC tuning element 150 to undergo further phase modulation, and are recombined by separating and combining subassembly 109 to form outgoing circularly polarized beams 255, 256. For clarity, these outgoing beams are combined with the incoming beams as double-headed arrows in FIG. 1. Outgoing circularly polarized beams 255, 256 are reflected by mirror 108 and through quarter wave plate 107 along the same optical path as incoming parallel beams 205, 206. Quarter wave plate 107 converts each of outgoing circularly polarized beams 255, 256 to linearly polarized beams 257, 258, where the polarization states of linearly polarized beams 257, 258 are set by the phase difference between the dashed line and solid line optical beams in separating and combining subassembly 109. The p-polarized portions of linearly polarized beams 257, 258 pass directly through polarizing beam splitter 106, are combined into a single output beam 270 by output collimator 115, and are directed to photodiode 131. The s-polarized portions of linearly polarized beams 257, 258 are deflected by polarizing beam splitter 106 and the polarization states thereof are rotated by 90 degrees to become p-polarized beams 261, 262 after passing through 22.5 degree half wave plate 105 and Faraday rotator 104. P-polarized beams 261, 262 then pass directly through polarizing beam splitter 103, are reflected by mirror 116 to output collimator 117, are combined into a single output beam 280 by output collimator 117, and are directed to photodiode 132. Output collimators 115 and 117 may be configured substantially similarly to input collimator 101 in FIG. 2 but oriented to receive two parallel light beams having the same linear polarization state and combine the two beams into a single light beam having two linear polarization states. Thus, photodiode 132 receives one component of phase-modulated input signal 120 and photodiode 131 receives a time-delayed component of phase-modulated input signal 120, so that the intensity interference between the two components can be measured to generate a demodulated signal corresponding to a phase difference between the contiguous symbols contained in the two components.

In the embodiment illustrated in FIG. 1, delay line interferometer 100 includes two optical output ports, i.e., output collimators 115 and 117. In such an embodiment, the use of two ports may balance the output signals from delay line interferometer 100 to increase the signal-to-noise ratio thereof. In other embodiments, delay line interferometer 100 may instead use a single output port. Similarly, delay line interferometer 100 is illustrated with a substantially bi-directional configuration. In alternative embodiments, a delay line interferometer may be configured as a unidirectional device, in which an optical input beam passes through the optical elements of the delay line interferometer a single time. In such an embodiment, the functions of separating and combining subassembly 109 may be divided into two independent optical elements. Similarly, in such an embodiment, LC tuning element 150 and optical delay element 113 may be configured to condition light transmitted therethrough in a single pass, rather than in a double pass. Further, it should be understood by those skilled in the art that the specific optical path shown in FIG. 2 is only one possible embodiment. Thus, the specific arrangement of mirrors 108, 116, polarizing beam splitters 103, 106, and the assorted polarization plates illustrated in FIG. 1 may be altered and/or additional beam steering optics may be included without departing from embodiments of the invention. For example, a delay line interferometer, according to embodiments of the invention, may include optical components or subassemblies useful for avoiding refraction, walk-off, or other unwanted effects.

Figure 4:
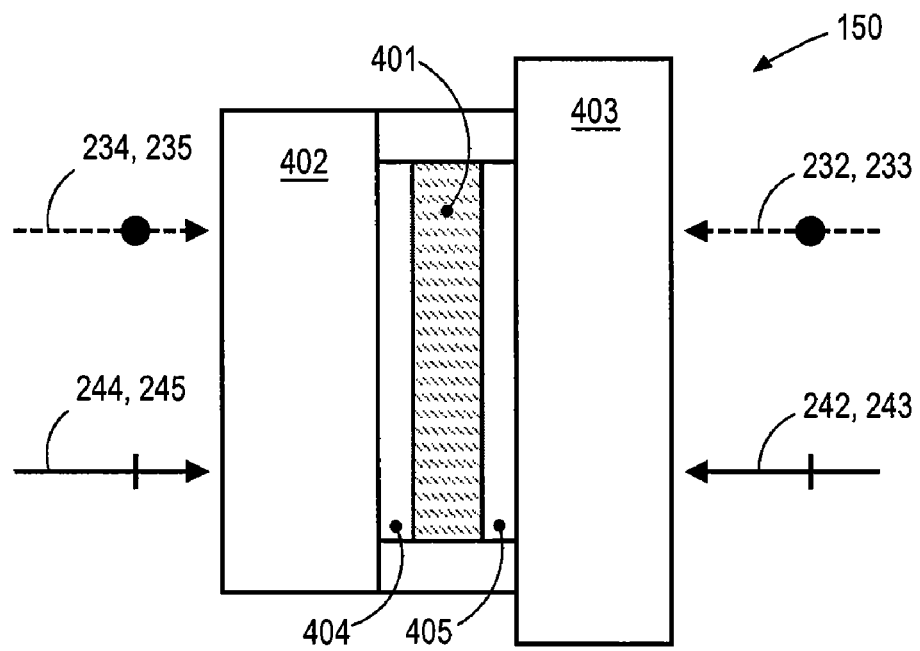
FIG. 4 schematically illustrates a cross-sectional view of an LC tuning element for an optical delay element in a delay line interferometer, according to embodiments of the invention.

FIG. 4 schematically illustrates a cross-sectional view of LC tuning element 150 for optical delay element 113 in delay line interferometer 100, according to embodiments of the invention. LC tuning element 150 includes an LC pixel layer 401 formed between two transparent plates 402, 403, which are laminated together to form the LC pixels P1 and P2 (shown in FIGS. 5A, 5B) using techniques commonly known in the art. Transparent electrode assembly 404 and transparent electrode 405 are disposed as shown on interior surfaces of transparent plates 402, 403 and may be patterned from indium-tin oxide (ITO) layers. LC pixels P1 and P2 contain an LC material, such as twisted nematic (TN) mode material, electrically controlled birefringence (ECB) mode material, etc., and transparent electrode assembly 404 and transparent electrode 405 selectively apply a potential difference across each of LC pixels P1, P2, thereby selectively modulating the phase of incident linearly polarized light, i.e., incoming s-polarized beams 232, 233, incoming p-polarized beams 242, 243, outgoing s-polarized beams 234, 235, and outgoing p-polarized beams 244, 245.

The alignment direction of the LC material in LC pixels P1 and P2 is parallel to the incoming polarization, and the LC material alignment is parallel to the glass substrates. The function of the LC material is to serve as a phase modulator, where the LC phase modulation is ranged from 0 to $2\pi$. When a high voltage is applied to the LC material in an LC pixel, the LC alignment will be along the electrical field, which induces zero optical retardation, i.e., no phase shift. When a low voltage is applied, the liquid crystal will align along the electrical field but with a tilt angle, which is determined by the amplitude of voltage applied. The phase shift can be calibrated as a function of voltage, so the phase of polarized light that propagates through an LC pixel may be tuned from 0 to $2\pi$ in very fine steps. In one embodiment, such a phase shift is calibrated as a linear function of applied voltage. By controlling the voltage applied to pixel P1 and P2, the phase difference can be varied between incoming s-polarized beams 232, 233 and incoming p-polarized beams 242, 243 beams in the range of 0 to 2π, thereby tuning the central wavelength of delay line interferometer 100 between constructive and destructive interference for maximum demodulated signal. Because the response time of the LC material in LC pixels P1, P2 is on the order of 100 ms, delay line interferometer 100 is capable of phase tuning much faster, e.g., 10 times or more, than delay line interferometers using other methods known in the art, such as thermal tuning techniques, which typically require several seconds to complete a tuning procedure.

Figure 5A:
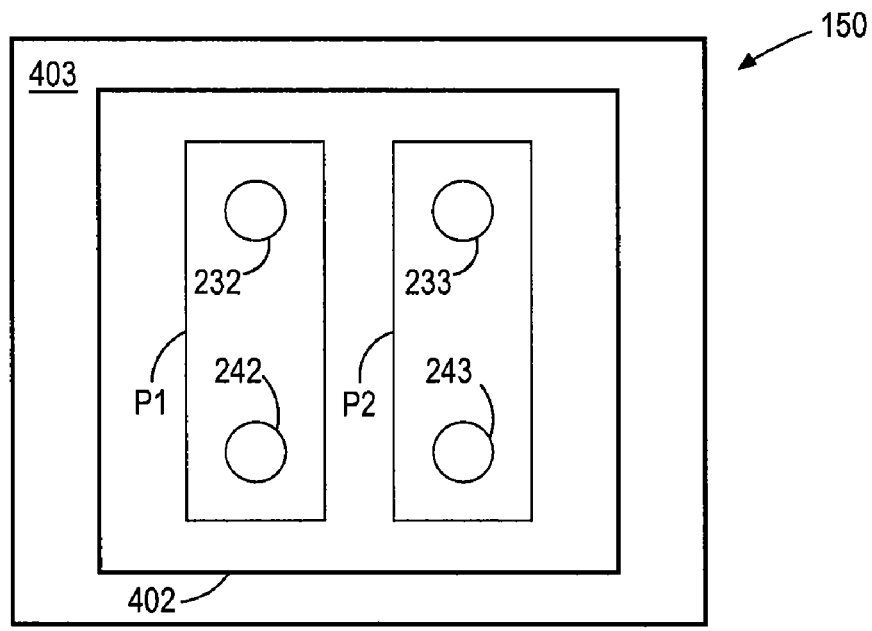
FIGS. 5A and 5B schematically illustrate different configurations of LC pixels, according to embodiments of the invention.
Figure 5B:
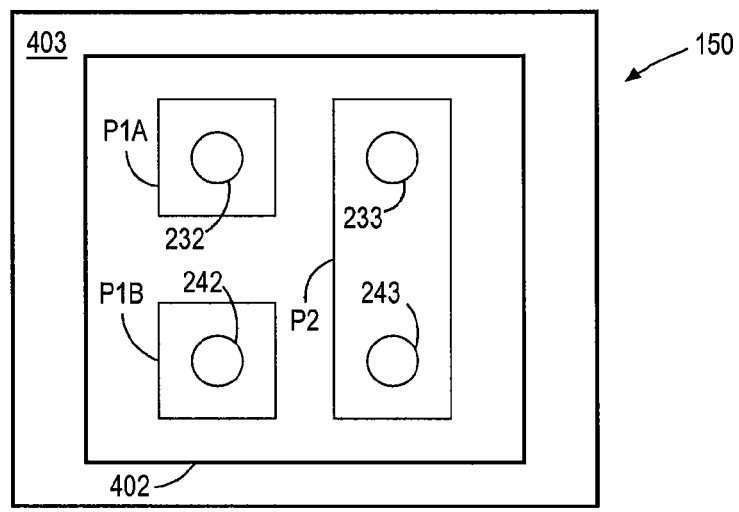

FIGS. 5A and 5B schematically illustrate different configurations of LC pixels P1, P2 in the embodiment of LC tuning element 150 illustrated in FIG. 4, according to embodiments of the invention. For clarity of description, the positions of incoming light beams, i.e., incoming s-polarized beams 232, 233 and incoming p-polarized beams 242, 243, are denoted in FIGS. 5A and 5B and outgoing light beams are omitted. In FIG. 5A, LC pixels P1, P2 are configured symmetrically as shown, so that light beams of the same polarization are split between each of the pixels. In particular, incoming s-polarized beam 232 is incident on LC pixel P1 and incoming s-polarized beam 233 is incident on LC pixel P2. Similarly, incoming p-polarized beam 242 is incident on LC pixel P1 and incoming p-polarized beam 243 is incident on LC pixel P2. By independently controlling the voltage applied to LC pixels P1 and P2, the phase difference can be varied between incoming s-polarized beams 232, 233 and incoming p-polarized beams 242, 243, in order to tune the central wavelength of delay line interferometer 100. The size and position of LC pixels P1 and P2 is determined by the configuration of transparent electrode assembly 404. Specifically, in the embodiment illustrated in FIG. 5A, transparent electrode assembly 404 includes two transparent electrodes (not shown for clarity), one having a "footprint" that defines the shape and location of LC pixel P1 and one that defines the shape and location of LC pixel P2.

Figure 6:
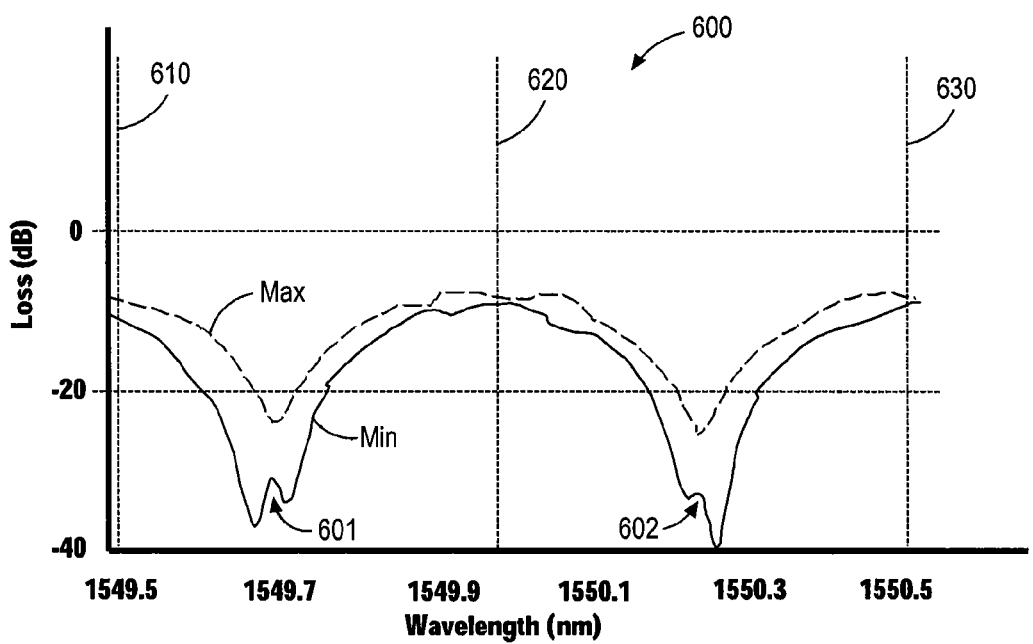
FIG. 6 is a graph illustrating a portion of the loss spectrum for an optical delay line interferometer.

Polarization dependence of an optical delay line interferometer can result in polarization-dependent frequency shift in the output of the interferometer. Specifically, when unwanted birefringence occurs in one or more components of an interferometer, such as in the silicon-based body 300 of optical delay element 113, the polarization dependence caused by such birefringence can affect the loss spectrum of the optical delay line interferometer. Alteration of the loss spectrum from the optimum reduces the signal-to-noise ratio of the interferometer output. FIG. 6 is a graph 600 illustrating a portion of the loss spectrum for an optical delay line interferometer substantially similar to delay line interferometer 100, in which LC tuning element 150 has LC pixels P1, P2 configured as shown in FIG. 5A. The loss spectrum corresponds to a frequency band that includes three frequency channels 610, 620, and 630. Polarization-dependent frequency shift alters the loss spectrum of the interferometer, producing sub-peaks 601, 602. Because sub-peaks 601 and 602 are positioned between frequency channels 610, 620, and 630, the signal-to-noise ratio of the interferometer is reduced.

Figure 7:
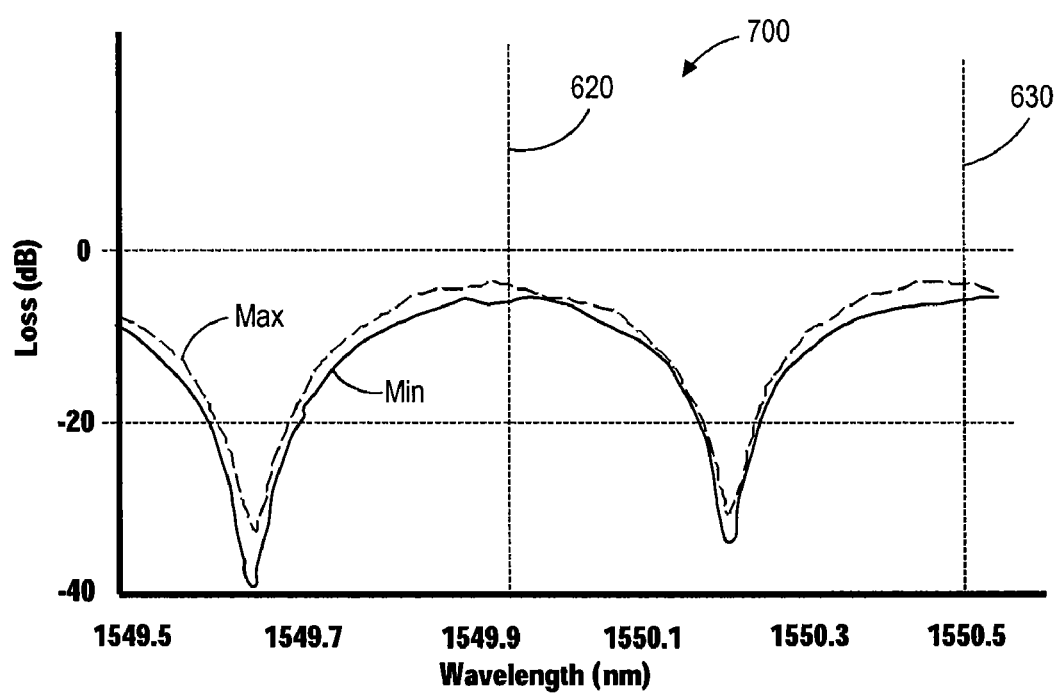
FIG. 7 is a graph illustrating a portion of the loss spectrum for another optical delay line interferometer.

In FIG. 5B, LC pixel P2 is configured substantially the same as in FIG. 5A, and LC Pixel P1 includes two independently controllable subpixels P1A and P1B. Subpixel P1A is positioned for modulating the phase of incoming s-polarized beam 232 and outgoing s-polarized beam 234 (not shown for clarity), and subpixel P1B is positioned for modulating the phase of incoming p-polarized beam 242 and outgoing p-polarized beam 244 (not shown for clarity). Because polarization-dependent phase shift is equivalent to phase shift between the linear polarization states of a phase-modulated signal, polarization-dependent phase shift can be compensated for in delay line interferometer 100 by introducing an additional phase shift in the phase-modulated signal using LC subpixels P1A, P1B. Such a phase shift is produced by applying a different voltage to each of LC subpixels P1A and P1B. FIG. 7 is a graph 700 illustrating a portion of the loss spectrum for an optical delay line interferometer substantially similar to delay line interferometer 100, in which LC tuning element 150 has LC pixels P1, P2 configured as shown in FIG. 5B. As shown, polarization-dependent frequency shift has been compensated for and the performance of the interferometer substantially improved. Thus, according to embodiments of the invention, the polarization-dependent frequency shift of delay line interferometer 100 can be reduced without the use of additional high-precision optical elements and/or coatings.

Figure 8:
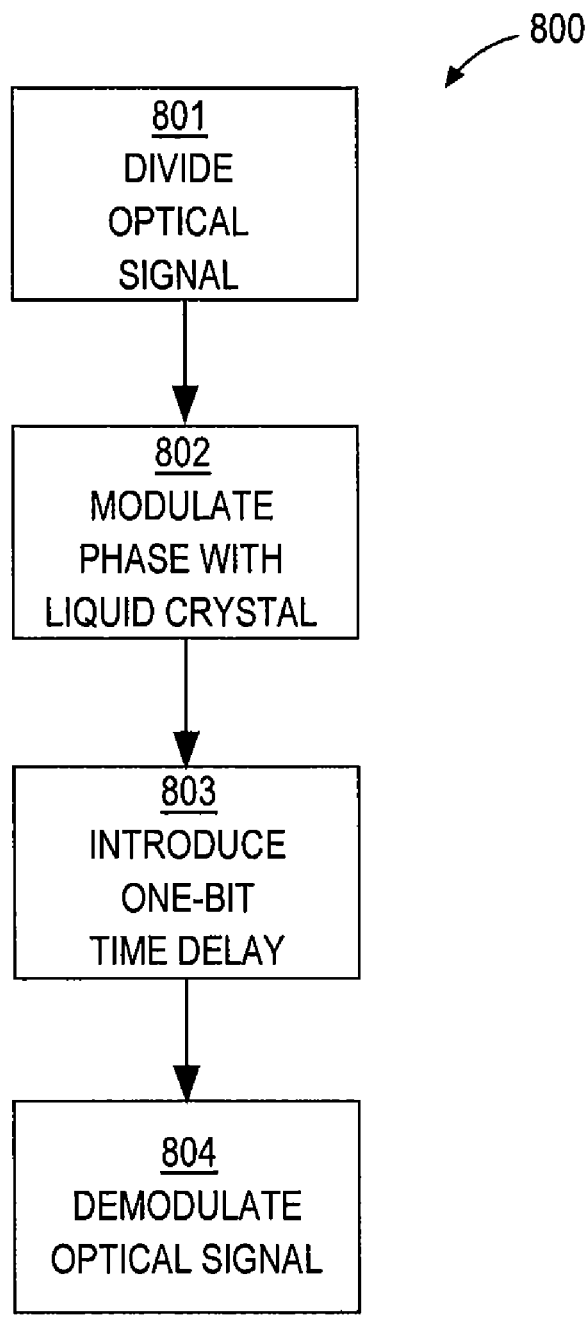
FIG. 8 is a flow chart that summarizes, in a stepwise fashion, a method of demodulating a phase-modulated optical signal, according to embodiments of the invention.

FIG. 8 is a flow chart that summarizes, in a stepwise fashion, a method 800 of demodulating a phase-modulated optical signal, according to embodiments of the invention. Method 800 is described in terms of a delay line interferometer substantially similar delay line interferometer 100, described above. However, other delay line interferometers may also benefit from the use of method 800.

In step 801, delay line interferometer 100 receives phase-modulated input signal 120 at input collimator 101, which converts phase-modulated input signal 120 into two parallel beams 205, 206 that are spatially separated and have the same linear polarization state. Parallel beams 205, 206 are directed to separating and combining subassembly 109, converted to circularly polarized light beams, and are each divided into two constituent parts by separating and combining subassembly 109. Specifically, parallel beam 205 is converted to circularly polarized beam 215 and is then split into incoming p-polarized beam 230 and incoming s-polarized beam 240. Similarly, parallel beam 206 is converted to circularly polarized beam 216 and is then split into incoming p-polarized beam 231 and incoming s-polarized beam 241. Thus, incoming p-polarized beams 230, 231 then act as a first light beam (made up of a pair of beams) to be treated by LC tuning element 150 and optical delay element 113, and incoming s-polarized beams 240, 241 act as a second light beam (also made up of a pair of beams) to be treated by LC tuning element 150 and optical delay element 113.

In step 802, the phase of the first light beam is modulated with respect to the phase of the second light beam to tune the phase difference therebetween and tune the central wavelength of delay line interferometer 100. Phase modulation is accomplished by directing the first light beam and the second light beam through LC tuning element 150. LC tuning element 150 performs the desired phase modulation by applying a first voltage across a first LC pixel of the LC tuning element and a second voltage across a second LC pixel of the LC tuning element. Because a portion of the first light beam and a portion of the second light beam is directed through the first LC pixel and a remainder portion of the first light beam and a remainder portion of the second light beam is directed through the second LC pixel, phase difference between the first light beam and the second light beam can be tuned as desired.

In some embodiments, LC tuning element 150 performs the desired phase modulation in a single pass. In other embodiments, delay line interferometer 100 may have a bi-directional configuration, and in such embodiments the first and second light beams are directed through LC tuning element 150 for two passes. Thus, half of the desired phase modulation may be induced by LC tuning element 150 in the first pass and half may occur in the second pass.

In step 803, a substantially one-bit time delay is introduced in the first light beam. Any of a number of optical delay devices may be used in step 803, such as optical delay element 113.

In step 804, interference in the time domain between the phase-modulated first light beam and the second light beam is used to demodulate the phase-modulated optical signal. In some embodiments, the first light beam and the second light beam are first combined into a single light beam prior to measuring the interference intensity.

In sum, embodiments of the invention provide a delay line interferometer with an LC tuning element. The LC tuning element may be configured to quickly tune the phase difference between two optical signals separated from a phase-modulated input signal and to reduce polarization-dependent frequency shift of a delay line interferometer without the use of additional high-precision optical elements and/or coatings. In addition, embodiments of the invention as described herein may be realized using combinations of basic and easy-to-manufacture optical components.

While the foregoing is directed to embodiments of the present invention, other and further embodiments of the invention may be devised without departing from the basic scope thereof, and the scope thereof is determined by the claims that follow.

We claim:

1. An interferometer comprising:
a beam-splitting element configured to spatially separate a phase-modulated light beam into a first light beam having a first linear polarization state and a second light beam having a second linear polarization state, wherein the first linear polarization state is orthogonal to the second linear polarization state;
an optical time delay element disposed in a path of the first light beam and a path of the second light beam, wherein the optical time delay element is configured to create a longer optical path for the first light beam than for the second light beam; and
a liquid crystal (LC) tuning element disposed in the path of the first light beam, wherein the LC tuning element is configured to modulate the phase of the first light beam with respect to the phase of the second light beam.

2. The interferometer according to claim 1, wherein the longer optical path length is configured to create a substantially one-bit time delay between the first light beam and the second light beam.

3. The interferometer according to claim 1, wherein the LC tuning element is disposed in the path of the second light beam and wherein the LC tuning element is configured to modulate the phase of the second light beam with respect to the phase of the first light beam.

4. The interferometer according to claim 3, wherein the LC tuning element comprises:
a first LC pixel configured to modulate the phase of a first portion of the first light beam and a first portion of the second light beam; and
a second LC pixel configured to modulate the phase of a second portion of the first light beam and a second portion of the second light beam.

5. The interferometer according to claim 4, wherein the first LC pixel comprises;
a first subpixel configured to modulate the phase of the first portion of the first light beam; and
a second subpixel configured to modulate the phase of the first portion of the second light beam.

6. The interferometer according to claim 1, further comprising a beam-combining element configured to combine the phase-modulated first light beam and the second light beam.

7. The interferometer according to claim 6, wherein the beam-splitting element and the beam-combining element are configured as a single bi-directional assembly.

8. The interferometer according to claim 7, wherein the bi-directional assembly comprises two birefringent elements separated by a half wave plate.

9. The interferometer according to claim 1, wherein the optical time delay element comprises a dual mirror having a first reflective surface disposed in the path of the first light beam and a second reflective surface disposed in the path of the second light beam.

10. The interferometer according to claim 1, wherein the phase-modulated light beam is circularly polarized.

11. The interferometer according to claim 10, further comprising a wave plate configured to convert the circularly polarized light beam to a linearly polarized light beam.

12. The interferometer according to claim 11, further comprising a polarizing beam splitter disposed in the path of the linearly polarized light beam, a first output port and a second output port, wherein the polarizing beam splitter is configured to direct a portion of the linearly polarized light beam to the first output port and a remainder portion of the linearly polarized light beam to the second output port.

13. The interferometer according to claim 1, wherein the LC tuning element modulates the phase of the first light beam with respect to the phase of the second light beam by applying a first voltage across a first LC pixel of the LC tuning element and a second voltage across a second LC pixel of the LC tuning element.

14. An interferometer comprising:
a beam-splitting element configured to spatially separate a phase-modulated light beam into a first light beam having a first linear polarization state and a second light beam having a second linear polarization state, wherein the first linear polarization state is orthogonal to the second linear polarization state;
an optical time delay element disposed in a path of the first light beam and a path of the second light beam, wherein the optical time delay element is configured to create a longer optical path for the first light beam than for the second light beam;
an LC tuning element disposed in the path of the first light beam and in the path of second light beam, wherein the LC tuning element is configured to modulate the phase of the first light beam with respect to the phase of the second light beam and the phase of the second light beam with respect to the phase of the first light beam;
a beam-combining element configured to combine the phase-modulated first light beam and the second light beam into a circularly polarized light beam;
a wave plate configured to convert the circularly polarized light beam to a linearly polarized light beam; and
a polarizing beam splitter configured to direct an optical input from an input port to the beam-splitting element and the linearly polarized light beam from the beam-combining element to an output port.

15. A method of demodulating a phase-modulated optical signal, the method comprising:
dividing the phase-modulated optical signal into a first light beam having a first linear polarization state and a second light beam having a second linear polarization state, wherein the first linear polarization state is orthogonal to the second linear polarization state;

introducing a substantially one-bit time delay in the first light beam;

modulating the phase of the first light beam with respect to the phase of the second light beam by directing the first light beam through an LC tuning element; and using interference in the time domain between the phase-modulated first light beam and the second light beam to demodulate the phase-modulated optical signal.

16. The method according to claim 15, further comprising modulating the phase of the second light beam with respect to the phase of the first light beam by directing the second light beam through the LC tuning element.

17. The method according to claim 16, further comprising:

directing a portion of the first light beam through a first LC pixel in the LC tuning element;

directing a portion of the second light beam through a second LC pixel in the LC tuning element; and modulating the phase of the portion of the first light beam with respect to the portion of the second light beam to reduce polarization-dependent frequency shift of the delay line interferometer.

18. The method according to claim 15, further comprising combining the phase-modulated first light beam with the second light beam into a single light beam.

19. The method according to claim 18, further comprising converting the single light beam from being circularly polarized to being linearly polarized.

20. The method according to claim 19, further comprising:

directing a portion of the single light beam to a first output port using a polarizing beam splitter; and directing a remainder portion of the single light beam to a second output port using the polarizing beam splitter.

* * * * *